United States Patent Office 3,717,547
Patented Feb. 20, 1973

3,717,547
PROCESS FOR PRODUCING URIDINE-5′-DIPHOSPHOGLUCOSE
Kiyoshi Nakayama, Sagamihara-shi, and Hiroshi Hagino, Tokyo-to, Japan, assignors to Kyowa Hakko Kogyo Co., Ltd., Tokyo, Japan
No Drawing. Filed Dec. 31, 1969, Ser. No. 889,691
Claims priority, application Japan, Jan. 17, 1969, 44/2,932
Int. Cl. C12d 13/06
U.S. Cl. 195—28 N                9 Claims

ABSTRACT OF THE DISCLOSURE

Uridine-5′-diphosphoglucose is produced in a fermentation process utilizing Brevibacterium, Corynebacterium, arthrobacter or Micrococcus in a culture medium containing orotic acid and/or uracil and dry yeast.

BACKGROUND OF THE INVENTION

The present invention relates to a process for producing uridine-5′-diphosphoglucose (hereinafter abbreviated to UDPG) by a fermentation method. More particularly, the invention relates to a process for producing UDPG economically on an industrial scale by using bacterial fermentation.

UDPG is a compound useful as an additive in milk (see U.S. Pat. 3,231,385) and as a reagent in biochemical studies. It also operates as a coenzyme in glucose metabolism. It has the following formula:

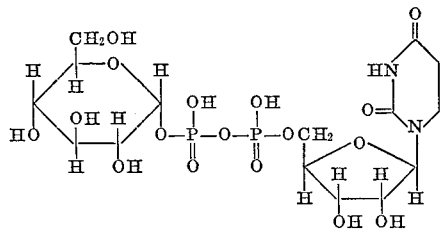

UDPG has heretofore been produced by separation from bakers' yeasts (Journal of Biological Chemistry, vol. 184, p. 333 (1950)) or by a synthetic method (Journal of American Chemical Society, vol. 80, p. 3756 (1958)). These methods, however, are not entirely satisfactory for producing UDPG on an industrial scale because factors of yield and cost have been prohibitive. UDPG at present is therefore regarded as exceedingly expensive.

It is also known that UDPG is accumulated when uridine monophosphate (UMP) or uridine diphosphate (UDP) is cultured together with cell-free extract of yeasts (Archives of Biochemistry and Biophysics, vol. 34, p. 482 (1951)). These substrates however are expensive as well, so that this particular yeast fermentation method is likewise not suitable.

SUMMARY OF THE INVENTION

In accordance with the present invention, a method has been discovered where UDPG is formed and accumulated in remarkable amount in a bacterial culture liquid, starting from inexpensive orotic acids or uracil. Such a method has industrial implications since it does not involve the use of UMP or UDP as starting materials.

The most significant characteristic of the present invention is that a bacteria belonging to any of the genera Brevibacterium, Corynebacterium, Arthrobacter or Micrococcus is used as the culturing organism and that said organism is cultured in a medium containing orotic acid or uracil and dry yeast.

With regard to the composition of the medium employed in the present invention, any culture medium which contains a suitable amount of sacchrine materials or other carbon source, such as glucose, starch hydrolysate, molasses, etc., a nitrogen source, such as urea, ammonium chloride, ammonium nitrate, ammonium sulphate, etc., and natural substances containing nitrogen, such as corn-steep liquor, yeast extract, peptone, fish meal, etc. may be employed. When strains having nutritional requirements are used, the substances which satisfy these nutritional requirements should be added to the culture medium as appropriate.

In practising the invention, a microorganism is inoculated into a suitable medium and orotic acid or uracil (or both of them) together with dry yeast is added during the culturing. The culturing is carried out until UDPG is accumulated in substantial amount in the culture liquid. The orotic acid and uracil may be added to the culture medium before inoculation. It is preferred that they be used at a total combined concentration of from 0.1 g./l. and 50 g./l. but preferably at from 0.5 g./l. to 10 g./l. The said compounds, of course, are usable in the form of their non-toxic salts. The dry yeasts are obtained in known ways such as by drying yeast using acetone wash procedure, freeze drying or air drying. As yeasts various microorganisms such as Saccharomyces cerevisiae, Saccharomyces lactis, Torulopsis sphaerica, Canadida guillermondii, Kloeckera africana, Zygosaccharomyces major, and the like may be used.

Undried bakers' yeast or brewers' yeast on the market may be dried for example by acetone drying, freeze drying and air drying. Alternatively, dry yeast available on the market for baking can be utilized directly without any other treatment. The yeast can be employed at various concentrations. Suitably, however, a range of 5 g./l. to 200 g./l. is commonly favorable to the accumulation of UDPG in a short period of time.

Fermentation is carried out under aerobic conditions for example by using shaking culture technique or aeration-agitation of the submerged culture. Favorable and preferred culturing conditions are: temperature 20° to 40° C., pH 4.0 to 9.5. The period of culturing is generally 2 to 8 days. Orotic acid or uracil may be added at the start of culturing, that is, before inoculation, or during the culturing together with dry yeast. As shown in the examples, favorable results are generally obtained when orotic acid or uracil is added during culturing with subsequent addition of the dry yeast after fermentation has proceeded for some time. Inorganic phosphate and saccharine materials may be added simultaneously with the addition of dry yeast. UDPG is recovered from the culture medium after substantially maximal accumulation has taken place. The accumulation of UDPG can be followed by analytical methods, such as paper chromatography, thin-layer chromatography and the like.

The separation of UDPG from the culture medium after completion of culturing can be carried out by known techniques such as by ion exchange resin treatment and adsorption with carbon powder. For instance, a method found by H. G. Pontis and others (Biochemica Biophysica Acta, vol. 26, p. 146 (1957)) is applicable.

EXAMPLE 1

Brevibacterium ammoniagenes ATCC 6872 is used as the seed strain and is cultured in a seed medium containing 2% of glucose, 1% of peptone, 1% of yeast extract, 0.3% of NaCl and 30 μg./l. of biotin at 30° C. for 24 hours. The seed culture is then inoculated at a ratio of 10% (by volume) into a fermentation medium having the following composition:

| | |
|---|---|
| Glucose | g__ 100 |
| Urea | g__ 6 |
| $KH_2PO_4$ | g__ 10 |
| $K_2HPO_4$ | g__ 10 |
| $MgSO_4 \cdot 7H_2O$ | g__ 10 |
| $CaCl_2 \cdot 2H_2O$ | g__ 0.1 |
| Biotin | μg__ 30 |
| Yeast extract | g__ 10 |

The fermentation medium is prepared in one liter of water and the pH thereof is adjusted to 8.0 with NaOH. Thereafter, the fermentation medium is poured into flasks and sterilized at 1 kg./cm.² for 10 minutes in an autoclave. Twenty ml. portions of fermentation medium are poured into 250 ml. conical flasks, respectively, and are sterilized before use.

The flasks containing the inoculated fermentation medium are cultured aerobically with shaking at 30° C. After 72 hours of fermentation, orotic acid is added in a concentration of 2 g./l. and further fermentation is carried out for 48 hours. Dry yeast ("Oriental dry yeast") is next added in a concentration of 100 g./l. and culturing is continued furthermore for 2 hours. As a result, UDPG is accumulated in the culture medium at a level of 3.6 mg./ml.

The centrifuged supernatant of one liter of the said culture medium is adjusted to pH 7.0, then passed through a column consisting of strong basic anion exchange resin, Dowex 1X4 (Cl⁻ type). The UDPG portion is extracted out and collected by the so called gradient extracting methods in which a sodium chloride solution dissolved in 0.1 N HCl is passed into the column, the concentration having been increased gradually from 0.02 N to 0.2 N. The said collected UDPG portion is, after being adsorbed with carbon powder, extracted out by 50% alcohol and is collected. The resultant UDPG portion is concentrated under reduced pressure, neutralized by barium hydroxide to pH 8.0, and precipitated by the addition of alcohol. The system is centrifuged and the precipitate washed with alcohol and ether, and dried on calcium chloride in a vacuum desiccator. As a result, 700 mg. of UDPG barium salt is obtained.

When the above procedure is conducted using *Brevibacterium ammoniagenes* ATCC 6871 instead of *Brevibacterium ammoniagenes* ATCC 6872, 21 mg./ml. of UDPG is accumulated in the fermentation medium.

EXAMPLE 2

The procedure of Example 1 is followed except that in place of orotic acid, uracil is used at a concentration of 2 mg./ml. UDPG is accumulated in the fermentation medium at a level of 3.3 mg./ml.

EXAMPLE 3

The fermentation is conducted in the same manner as in Example 1 except that the dry yeast is added simultaneously to the culture medium with the orotic acid. UDPG is accumulated in the culture liquid at a level of 3.9 mg./ml.

EXAMPLE 4

The procedure of Example 1 is followed except that an acetone dried cell of bakers' yeast ("Dia yeast") is used instead of "Oriental dry yeast," and the glucose is further added in a concentration of 5% simultaneously with the addition of dry yeast. UDPG is accumulated in the culture liquid at a level of 3.6 mg./ml.

EXAMPLE 5

Culturing is conducted in the same manner as in Example 1 except that the various microorganisms listed in Table 1 are used as the strains. The amount of accumulation in each case is also shown.

TABLE 1

| Microorganism: | Amount of accumulation of UDPG (mg./ml.) |
|---|---|
| Corynebacterium ATCC 21084 | 3.4 |
| Arthrobacter ATCC 21085 | 2.8 |
| *Micrococcus sodonensis* ATCC 15932 | 1.6 |
| *Arthrobacter citreus* ATCC 11624 | 1.7 |
| *Corynebacterium mycetoides* ATCC 21134 | 2.1 |

EXAMPLE 6

Culturing is conducted in the same manner as in Example 1 except that acetone dried cells of the microorganisms indicated in Table 2 are used as dry yeasts. The amount of accumulation of UDPG is shown in Table 2.

TABLE 2

| Microorganism: | Amount of accumulation of UDPG (mg./ml.) |
|---|---|
| *Saccharomyces ceresviside* ATCC 15248 | 2.3 |
| *Saccharomyces lactis* ATCC 12425 | 2.1 |
| *Torulopis sphaerica* ATCC 8549 | 2.6 |
| *Zygosaccharomyces major* ATCC 15249 | 1.2 |
| *Kloeckera africana* ATCC 16512 | 0.9 |
| *Candida guillermondii* ATCC 9058 | 0.7 |

"Oriental dry yeast" and "Dia yeast" are the trade names of commercial baker's yeast, sold each by Oriental Yeast Co., Ltd., Tokyo, Japan and Kyowa Hakko Kogyo Co., Ltd., Tokyo, Japan. Taxonomically, they belong to *Saccharomyces ceresvisiae*.

What is claimed is:

1. A process for producing uridine-5′-diphosphoglucose which comprises culturing a microorganism belonging to genus Brivibacterium, Arthrobacter, Corynebacterium, or Micrococcus in a culture medium containing dry yeast and at least one of orotic acid and uracil, accumulating uridine-5′-diphosphoglucose in the culture medium and recovering the same from the said culture medium.

2. The process according to claim 1 wherein the culturing is performed aerobically.

3. The process according to claim 2 wherein the dry yeast is of one of the genera Saccharomyces, Torulopsis, Zygosaccharomyces, Kloeckera or Candida.

4. The process of claim 1 wherein the pH of the medium during fermentation is kept between 4 and 9.5.

5. The process of claim 1 wherein the temperature of the culture medium is between 20 and 40° C.

6. The process of claim 1 wherein the combined amount of uracil and orotic acid is between 0.5 and 10 g./l.

7. The process of claim 1 wherein the microorganism corresponds to *Brevibacterium ammoniagenes*.

8. The process of claim 1 wherein the microorganism corresponds to *Micrococcus sodonensis*.

9. The process of claim 1 wherein the microorganism corresponds to *Arthrobacter citreus*.

References Cited

UNITED STATES PATENTS 3,138,539   6/1964   Laufer et al. _____ 195—28 N

ALVIN E. TANENHOLTZ, Primary Examiner